(12) United States Patent
Hong

(10) Patent No.: US 6,256,351 B1
(45) Date of Patent: Jul. 3, 2001

(54) METHOD AND APPARATUS FOR DETERMINING A BANDWIDTH OF A VIDEO SIGNAL

(75) Inventor: Seung-Hoon Hong, Seoul (KR)

(73) Assignee: Daewoo Electronics Co., Ltd., Seoul (KR)

(*) Notice: Subject to any disclaimer, the term of this patent is extended or adjusted under 35 U.S.C. 154(b) by 0 days.

(21) Appl. No.: 09/116,817

(22) Filed: Jul. 17, 1998

(30) Foreign Application Priority Data

Oct. 24, 1997 (KR) ................................................ 97-54816

(51) Int. Cl.$^7$ ....................................................... H04N 7/12
(52) U.S. Cl. ......................................................... 375/240.26
(58) Field of Search ........................ 375/240.01, 240.18, 375/240.26, 240.12; H04N 7/12

(56) References Cited

U.S. PATENT DOCUMENTS 5,515,377 5/1996 Horne et al. .

FOREIGN PATENT DOCUMENTS 0723345 7/1996 (EP) .

OTHER PUBLICATIONS

J. Beran et al., "Long–Range Dependence in Variable–Bit-Rate Video Traffic", IEEE Transaction on Communications, vol. 43, No. 2/3/4, pp. 1566–1579, Feb. 1995.*

* cited by examiner

*Primary Examiner*—Young Lee
(74) *Attorney, Agent, or Firm*—Pennie & Edmonds LLP

(57) ABSTRACT

A method and apparatus for allocating a bandwidth to bit streams of a video signal having variable bit rates, wherein the bit streams are transmitted to an ATM(asynchronous transfer mode) network, encodes the video signal to thereby generate the bit streams of the encoded video signal. If the bit streams are of a time domain, the bit streams are transformed into a frequency domain, and if the bit streams are of the frequency domain, the bit streams are passed on without being transformed. Then, power spectral density S(f) of the bit streams of the frequency domain is calculated, an intermediate parameter I is determined based on the power spectral density S(f), and a Hurst parameter H is evaluated based on the intermediate parameter I. The bit streams are allocted with a bandwidth based on the Hurst parameter H and transmitted to the ATM network based on the allocated bandwidth.

13 Claims, 2 Drawing Sheets

METHOD AND APPARATUS FOR DETERMINING A BANDWIDTH OF A VIDEO SIGNAL

FIELD OF THE INVENTION

The present invention relates to a method and apparatus for allocating a bandwidth of a video signal having variable bit rates; and, more particularly, to a method and apparatus for determining a bandwidth of a video signal based on a Hurst parameter evaluated by using a Fourier transform.

DESCRIPTION OF THE PRIOR ART

With the recent availability of large data sets of actual VBR(variable bit rate) video traffic measurements, the inherent features of the VBR video traffic, i.e., the features which are independent of scene and codec, have become one of the major topics in the traffic engineering for high-speed networks. The idea of utilizing the inherent features of the VBR video traffic may make it possible to move away from the models that are highly dependent on the scene and/or codec specifics toward a more universal description of the VBR video traffic.

The transport of VBR video images from such applications as video conference, video telephone, and full motion broadcast and studio quality video is expected to become a major traffic component of the networks. In order for these networks to meet the stringent performance criteria required for the VBR services and to provide efficient multimedia communications, the use of the ATM(asynchronous transfer mode) technique has been proposed.

In the ATM technique, a bandwidth is allocated to the VBR video traffic based on the inherent features characterizing of the VBR video traffic. One of the inherent features is a Hurst parameter representing the characteristics of the VBR video traffic (see, e.g., J. Beran et al., "Long-Range Dependence in Variable-Bit-Rate Video Traffic", *IEEE Trans. on Commun.*, Vol. 43, No. 2/3/4/, pp. 1566–1579, 1995), wherein the Hurst parameter is calculated by using a rescaled adjusted range statistics or, for short, R/S statistics.

Assuming observations or sequences $X_k$'s of video data having N frames, N being a positive integer and k being an integer ranging from 1 to N and $X_k$ representing the number of encoded bits for a kth frame of the video signal, the sample mean and the sample variance of the sequences $X_k$'s are $X_m$ (N) and $S^2$ (N), respectively, the R/S statistics of the sequences $X_k$'s may be defined as:

$$\frac{R(N)}{S(N)} = \frac{[\max(0, W_1, W_2, \ldots, W_N) - \min(0, W_1, W_2, \ldots, W_N)]}{S} \quad \text{Eq. (1)}$$

wherein, $W_k = (X_1 + X_2 + \ldots + X_k) - k \cdot X_m (N)$.

And, the expectation of R(N)/S(N) may be given by:

$$E\left[\frac{R(N)}{S(N)}\right] \approx C \cdot N^H, \text{ as } N \to \infty \quad \text{Eq. (2)}$$

wherein C is a constant and H is a Hurst parameter. The Hurst parameter is calculated based on Eqs. (1) and (2).

In practice, R/S analysis is based on a heuristic graphical approach. Formally, given a sample of N observations $X_k$'s, the entire samples are subdivided into K non-overlapping blocks, K being a positive integer smaller than N, and the rescaled adjusted range $R(t_i,d)/S(t_i,d)$ for each of new starting points is computed, wherein the new starting points are $t_1=1, t_2=(N/K)+1, t_3=(2N/K)+1, \ldots, t_k=\{(K-1) \cdot N/K\}+1$ and satisfy $(t_k-1)+d \leq N$. Here, $R(t_i, d)$ is defined as in Eq. (1) with $W_k$ replaced by $W_{ti+k} - W_{ti}$ and $S^2 (t_i, d)$ is the sample variance of $X_{ti+1}, X_{ti+2}, \ldots, X_{ti+d}$. Thus, for a given value of d, as many as K samples of R/S are obtained when d is small and as few as one sample is obtained when d is close to the total sample size N.

Next, logarithmically spaced values of d, starting with $d \approx 10$, are taken. Plotting $\log\{R(t_i,d)/S(t_i,d)\}$ versus $\log(d)$ results in a rescaled adjusted range plot. When the Hurst parameter H is defined, a typical rescaled adjusted range plot starts with a transient zone representing the short range dependence in the sample, but will eventually settle down and fluctuate along a straight street of slope H. A graphical R/S analysis is used to determine whether such an asymptotic behavior is supported by the data; and if it is affirmative, the asymptotic value of the Hurst exponent H is estimated usually by simple least square fit, wherein the value of the Hurst exponent H asymptotically approaches to the value of the street's slope.

Thereafter, the VBR video traffic is classified into roughly 3 categories, i.e., low-, medium-, and high-activity, based on the values of the corresponding empirical Hurst parameter. If the Hurst parameter lies between 0.5 and 0.75, the VBR video traffic corresponds to the low-activity category; if the Hurst parameter greater than 0.75 and smaller than 0.9, the VBR video traffic belongs to the medium-activity category; and if the Hurst parameter gets close to 1, the VBR video traffic falls in the high-activity category. Based on the classification, the VBR video traffic is allocated with a corresponding bandwidth and is transmitted to the ATM network by using the allocated bandwidth.

In the conventional R/S analysis scheme described above, the Hurst parameter is calculated by using the sample mean and the sample variance. In addition to this, the multiplication and divisional computations exalt a lengthy computation time. Furthermore, if the bit stream of an encoded video signal is of a frequency domain, the encoded video signal should be inverse-transformed into a time domain. Thus, there is a need to develop a simpler scheme to evaluate the Hurst parameter.

SUMMARY OF THE INVENTION

It is, therefore, a primary object of the invention to provide a more efficient method and apparatus for evaluating a hurst parameter of a video signal having variable bit rates by using a Fourier transform.

In accordance with one aspect of the present invention, there is provided a method for allocating a bandwidth to bit streams of a video signal having variable bit rates, wherein the bit streams are transmitted to an ATM(asynchronous transfer mode) network, comprising the steps of: (a) encoding the video signal to thereby generate the bit streams of the encoded video signal; (b) transforming the bit streams into a frequency domain if the bit streams are of a time domain to provide bit streams of the frequency domain and providing the bit streams without transforming them if the bit streams are of the frequency domain; (c) calculating power spectral density S(f) of the bit streams of the frequency domain; (d) determining intermediate parameter I based on the power spectral density S(f); (e) evaluating a Hurst parameter H based on the intermediate parameter I; (f) allocating a bandwidth to the bit streams based on the Hurst parameter H; and (g) transmitting the bit streams based on the allocated bandwidth.

In accordance with another aspect of the present invention, there is provided an apparatus for allocating a bandwidth to bit streams of a video signal having variable bit rates, wherein the bit streams are transmitted to an ATM (asynchronous transfer mode) network, comprising: means for encoding the video signal to thereby generate the bit streams of the encoded video signal; means for transforming the bit streams into a frequency domain if the bit streams are of a time domain to provide bit streams of the frequency domain and providing the bit streams if the bit streams are of the frequency domain; means for calculating power spectral density S(f) of the bit streams of the frequency domain; means for determining intermediate parameter I based on the power spectral density S(f); means for evaluating a Hurst parameter H based on the intermediate parameter I; means for allocating a bandwidth to the bit streams based on the Hurst parameter H; means for storing the bit streams; means for transmitting the stored bit streams based on the allocated bandwidth.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PROFFERED EMBODIMENTS

Figure 1:
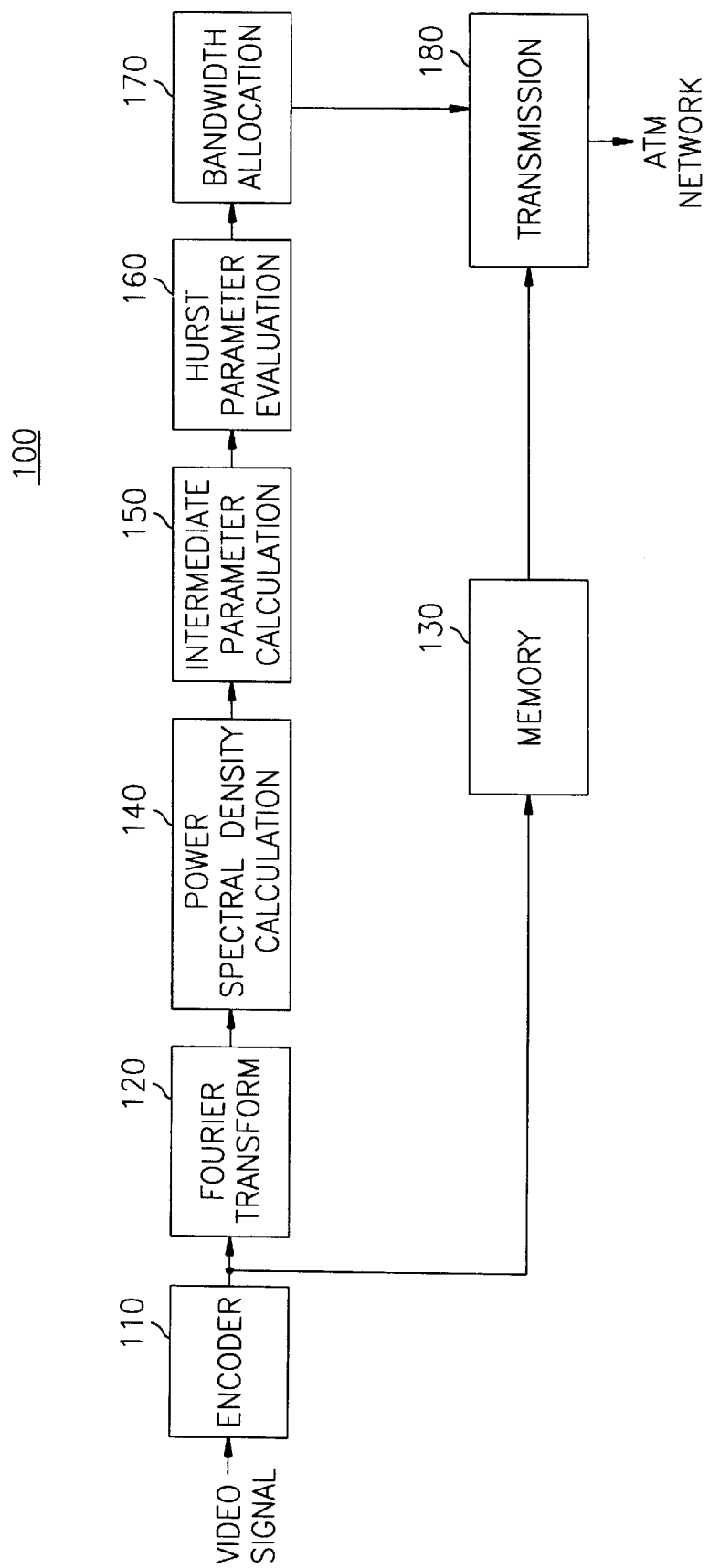
FIG. 1 depicts an apparatus for determining a bandwidth of a video signal having variable bit rates in accordance with a preferred embodiment of the present invention.

Referring to FIG. 1, there is depicted an apparatus 100 for determining a bandwidth of a video signal having variable bit rates in accordance with a preferred embodiment of the present invention. The video signal is compressed and encoded by an encoder 110 based on, e.g., the so-called MPEG(moving picture expert group)-II scheme. Bit streams containing data of the encoded video signal are provided from the encoder 110 to a Fourier transform block 120 and a memory 130.

If the bit streams provided to the Fourier transform block 120 are of a time domain, the Fourier transform block 120 transforms the bit streams of the time domain into a frequency domain and then provides the transformed bit streams of the frequency domain to a power spectral density calculation block 140; and if the bit streams provided to the Fourier transform block 120 are of the frequency domain, the Fourier transform block 120 directly provides the bit streams of the frequency domain to the power spectral density calculation block 140 without transforming the bit streams.

In detail, if the bit streams provided to the Fourier transform block 120 are of the time domain, the bit streams of the time domain X(t, T) are expressed as follows:

$$X(t, T) = \begin{cases} X(T) & \text{if } 0 < t < T \\ 0 & \text{if otherwise} \end{cases} \quad \text{Eq. (3)}$$

wherein T is a time interval during which the bit streams are applied to the Fourier transform block 120. The Fourier transform block 120 transforms the bit streams of the time domain X(t, T) into the bit streams of the frequency domain F(f, T) by using the following equation:

$$F(f, T) = \int_0^T X(t, T) \cdot e^{-j2\pi ft} dt. \quad \text{Eq. (4)}$$

Then, the bit streams of the frequency domain F(f, T) are applied to the power spectral density calculation block 140. Meanwhile, if the bit streams applied to the Fourier transform block 120 are the bit streams of the frequency domain F(f, T), the Fourier transform block 120 directly provides the bit streams of the frequency domain F(f, T) to the power spectral density calculation block 140 without transforming the bit streams.

The power spectral density calculation block 140 calculates power spectral density S(f, T) of the bit streams of the frequency domain F(f, T) by using the following equation:

$$S(f, T) = \frac{1}{T}|F(t, T)|^2. \quad \text{Eq. (5)}$$

When the value of T becomes infinite, Eq. (5) becomes as follows:

$$S(f) = \lim_{T \to \infty} \frac{1}{T}|F(t, T)|^2. \quad \text{Eq. (6)}$$

The power spectral density calculation block 140 provides the power spectral density S(f) to an intermediate parameter calculation block 150.

The intermediate parameter calculation block 150 calculates an intermediate parameter I based on the power spectral density S(f) by using a following equation:

$$S(f) \propto \frac{1}{f^I}. \quad \text{Eq. (7)}$$

Figure 2:
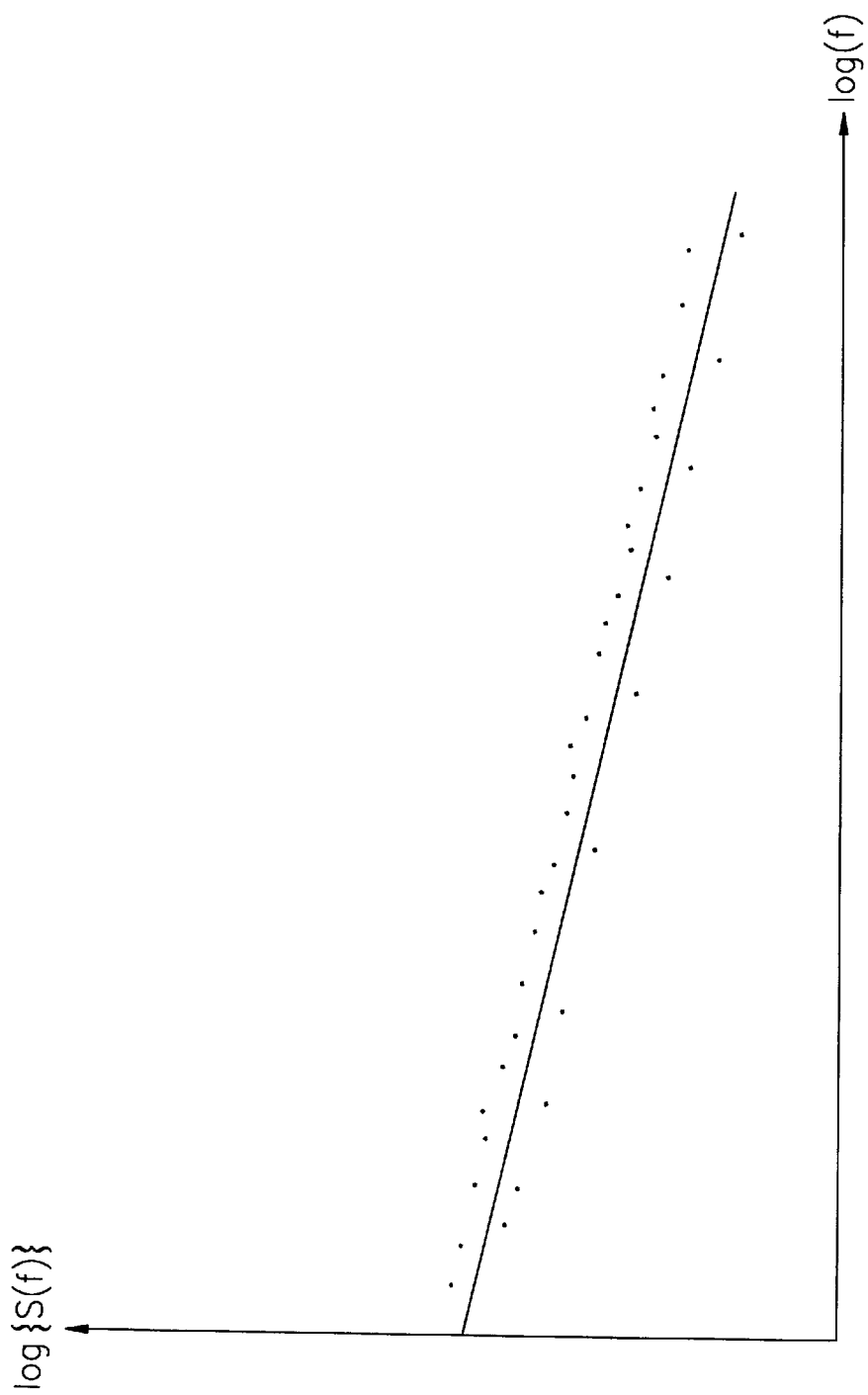
FIG. 2 shows a logarithmical description of $\log\{S(f)\}$ versus $\log(f)$ and its asymptotic line.

If a logarithmic function is applied on both sides of the Eq. (7), (−I) becomes a slope of a line representing $\log\{S(f)\}$ versus $\log(f)$. FIG. 2 represents a graphical method to determine the intermediate parameter I. In FIG. 2, dots correspond to $\log\{S(f)\}$ versus $\log(f)$ and a line is fitted to the dots as an asymptotic line, wherein the slope of the asymptotic line corresponds to (−I).

The intermediate parameter calculation block 150 provides the calculated intermediate parameter I to a Hurst parameter evaluation block 160. The Hurst parameter evaluation block 160 evaluates a Hurst parameter H based on the following equation:

$$H = \frac{I - 1}{2}. \quad \text{Eq. (8)}$$

The calculated Hurst parameter H is applied to a bandwidth allocation block 170.

The bandwidth allocation block 170 classifies a traffic characteristic of the bit streams by using the Hurst parameter to allocate a bandwidth to the bit streams based thereon. If the Hurst parameter lies between 0.5 and 0.75, the traffic of the bit streams corresponds to the low-activity; if the Hurst parameter lies between 0.75 and 0.9, the traffic of the bit streams corresponds to the medium-activity; and if the Hurst parameter goes close to 1, the traffic of the bit streams corresponds to high-activity. Based on the classified activity, the bit streams are allocated by a corresponding bandwidth. That is, to bit streams having a larger Hurst parameter, a wider bandwidth is allocated. The determined bandwidth is applied to a transmission block 180.

Meanwhile, the bit streams stored at the memory 130 is provided to the transmission block 180. The transmission block 180 transmits the bit streams to an ATM network based on the bandwidth determined at the bandwidth allocation block 170.

Thus, in accordance with the present invention, a Hurst parameter is simply determined by using a Fourier transform to thereby efficiently allocate a bandwidth to bit streams of an encoded video signal.

While the present invention has been described with respect to certain preferred embodiments only, other modifications and variations may be made without departing from the spirit and scope of the present invention as set forth in the following claims.

What is claimed is:

1. A method for allocating a bandwidth to bit streams of a video signal having variable bit rates, wherein the bit streams are transmitted to an ATM(asynchronous transfer mode) network, comprising the steps of:

(a) encoding the video signal to thereby generate the bit streams of the encoded video signal;

(b) transforming the bit streams into a frequency domain if the bit streams are of a time domain to provide bit streams of the frequency domain and providing the bit streams without transforming them if the bit streams are of the frequency domain;

(c) calculating power spectral density S(f) of the bit streams of the frequency domain;

(d) determining intermediate parameter I based on the power spectral density S(f);

(e) evaluating a Hurst parameter H based on the intermediate parameter I;

(f) allocating a bandwidth to the bit streams based on the Hurst parameter H; and (g) transmitting the bit streams based on the allocated bandwidth.

2. The method of claim 1, wherein the bit streams of the time domain of the step (b) is transformed into the bit streams of the frequency domain by using the following equation:

$$F(f,T) = \int_0^T X(t,T) \cdot e^{-j2\pi ft} dt$$

wherein X(t, T) is the bit streams of the time domain, T is a time interval during which the bit streams of the time domain is generated, and the F(f, T) is the bit streams of the frequency domain.

3. The method of claim 2, wherein the power spectral density S(f) of the step (c) is calculated by using the following equation:

$$S(f) = \lim_{T \to \infty} \frac{1}{T} |F(t,T)|^2.$$

4. The method of claim 3, wherein the intermediate parameter I of the step (d) is determined by using the following equation:

$$S(f) \propto \frac{1}{f^I}.$$

5. The method of claim 4, wherein the intermediate parameter determining step (d) includes the steps of:

(d1) taking a logarithm on both sides of the equation of claim 4 to generate the following equation:

$$\log[S(f)] = -I \cdot \log(f);$$

(d2) representing, by using dotting, the value of a left side of the equation generated at the step (d1);

(d3) determining an asymptotic line of the dots of the step (d2);

(d4) detecting a slope of the asymptotic line; and (d5) determining the intermediate parameter I by using the slope of the asymptotic line.

6. The method of claim 5, wherein the Hurst parameter H of the step (e) is evaluated by using the following equation:

$$H = \frac{I-1}{2}.$$

7. The method of claim 6, wherein the step (g) includes the step of:

(g1) storing the bit streams; and (g2) providing the stored bit streams to the ATM network based on the bandwidth allocated at the bandwidth allocating step (f).

8. An apparatus for allocating a bandwidth to bit streams of a video signal having variable bit rates, wherein the bit streams are transmitted to an ATM(asynchronous transfer mode) network, comprising:

means for encoding the video signal to thereby generate the bit streams of the encoded video signal;

means for transforming the bit streams into a frequency domain if the bit streams are of a time domain to provide bit streams of the frequency domain and providing the bit streams without transforming them if the bit streams are of the frequency domain;

means for calculating power spectral density S(f) of the bit streams of the frequency domain;

means for determining intermediate parameter I based on the power spectral density S(f);

means for evaluating a Hurst parameter H based on the intermediate parameter I;

means for allocating a bandwidth to the bit streams based on the Hurst parameter H;

means for storing the bit streams; and means for transmitting the stored bit streams based on the allocated bandwidth.

9. The apparatus of claim 8, wherein the bit streams of the time domain is transformed by the transforming means by using the following equation:

$$F(f,T) = \int_0^T X(t,T) \cdot e^{-j2\pi ft} dt$$

wherein X(t, T) is the bit streams of the time domain, T is a time interval during which the bit streams of the time domain is generated, and the F(f, T) is the bit streams of the frequency domain.

10. The apparatus of claim 9, wherein the power spectral density S(f) is calculated by the power spectral density calculating means by using the following equation:

$$S(f) = \lim_{T \to \infty} \frac{1}{T} |F(t, T)|^2.$$

11. The apparatus of claim 10, wherein the intermediate parameter I of the intermediate parameter determining means is determined by using the following equation:

$$S(f) \propto \frac{1}{f^I}.$$

12. The apparatus of claim 11, wherein the intermediate parameter determining means includes:
   means for taking a logarithm on both sides of the equation of claim 11 to generate the following equation:

$\log[S(f)] - I \cdot \log(f);$ means for representing, by using dotting, the value of a left side of the generated equation;

means for determining an asymptotic line of the dots represented by the representing means;

means for detecting a slope of the asymptotic line; and means for determining the intermediate parameter I by using the slope of the asymptotic line.

13. The apparatus of claim 12, wherein the Hurst parameter H of the Hurst parameter evaluating means is evaluated by using the following equation:

$$H = \frac{I - 1}{2}.$$

* * * * *